United States Patent [19]

Ellion et al.

[11] 4,069,664
[45] Jan. 24, 1978

[54] MONOPROPELLANT THRUSTER

[75] Inventors: M. Edmund Ellion, Arcadia; Philip A. Donatelli, Manhattan Beach, both of Calif.

[73] Assignee: Hughes Aircraft Company, Culver City, Calif.

[21] Appl. No.: 669,370

[22] Filed: Mar. 22, 1976

Related U.S. Application Data

[63] Continuation-in-part of Ser. No. 436,564, Jan. 24, 1974, abandoned.

[51] Int. Cl.$^2$ .......................... F02K 9/02; B01J 10/00
[52] U.S. Cl. .................................. 60/258; 60/200 R; 60/39.46 M; 23/288 L; 23/289
[58] Field of Search ............ 60/39.46 M, 200 R, 258, 60/39.69 A; 23/288 L, 288 R, 289

[56] References Cited

U.S. PATENT DOCUMENTS

| 3,377,140 | 4/1968 | Hall | 60/39.46 M |
|---|---|---|---|
| 3,695,041 | 10/1972 | Eggers et al. | 60/258 |
| 3,730,439 | 5/1973 | Parkison | 239/590.3 |
| 3,807,657 | 4/1974 | Brill | 60/200 R |
| 3,871,828 | 3/1975 | Ellion et al. | 60/39.46 M |

Primary Examiner—Robert E. Garrett
Attorney, Agent, or Firm—Allen A. Dicke, Jr.; W. H. MacAllister

[57] ABSTRACT

Monopropellant thruster has liquid hydrazine distribution nozzles of such structure as to direct streams of liquid hydrazine into hydrazine decomposition catalyst without puddling and without impinging thruster walls. Thruster also has screens to separate the dissociation catalyst into zones to prevent catalyst voids from standing adjacent distributor nozzles.

29 Claims, 6 Drawing Figures

MONOPROPELLANT THRUSTER

CROSS REFERENCE

This application is a continuation-in-part of patent application Ser. No. 436,564 filed Jan. 24, 1974, and now abandoned, which is relied upon for priority of the common subject matter.

BACKGROUND OF THE INVENTION

This invention is directed to a monopropellant thruster of the type where a liquid propellant is decomposed into a gas mixture with a net increase in temperature which is expelled to produce thrust. Hydrazine is a particular liquid.

Decomposition of liquid hydrazine is known in the prior art. Liquid hydrazine is discharged into contact with a catalyst material which initiates and sustains a net exothermic decomposition into gaseous products. The hydrazine liquid decomposes exothermically into gaseous ammonia, nitrogen and hydrogen. The ammonia decomposes endothermically into nitrogen and hydrogen, but the overall reaction gives off heat. In the present state of the art, the best dissociation catalyst for hydrazine is manufactured by the Shell Oil Company and is commercially available under the name "Shell 405 Catalyst." A number of different ways have been previously used to distribute liquid hydrazine into the catalyst bed, for breakdown of the incoming liquid hydrazine into the gaseous products, so that the hot gaseous products can product thrust.

One distribution method comprises the use of a manifold on the liquid hydrazine line with a plurality of small diameter tubes connected to the manifold to deliver the hydrazine to selected locations within the catalyst bed. The small diameter tubes are small bore hypodermic type tubes. Such structure has substantial volume of liquid in the manifold, which is necessarily in the vicinity of the hot catalyst bed because the small diameter tubes must be a fairly limited length. As a consequence of the tube and manifold volume, achievement of stable propellant flow after opening the valve takes a fairly long time. Furthermore, because of the heat soakback from the decomposition chamber through the tubes to the manifold subsequent to thruster firing, the temperature of the external manifold is raised above the auto-decomposition temperature of the hydrazine under some ON/OFF firing times. Under that circumstance, an attempt to fire the thruster by introduction of hydrazine into the manifold causes the hydrazine to detonate; this results in structural damage. Furthermore, with respect to this design, the small tubes are vulnerable to damage in handling and susceptible to fatigue due to vibration during launch. Such causes undesirable leakage of hydrazine.

Another prior art structure employs a porous mass of sintered material through which the hydrazine passes. The sintered material causes spreading of the liquid across the face of the catalyst bed. The hydrazine forms puddles on the sintered material, and, as a consequence of this, the hydrazine puddles periodically decompose to cause very large pressure surges and catalyst particle breakup. The fines generated by the catalyst particle breakup are expelled through the nozzle. The catalyst loss reduces useful life of the catalystic decomposition reactor. Furthermore, the sintered mass has considerable thermal mass and is directly adjacent the catalyst. This causes a rise in temperature after firing, with a result that there is auto-decomposition within the mass, if hydrazine is fed to the reactor before the sintered mass has a sufficient time to cool down.

Still another structure employs a perforated dome which discharges liquid streams into a void maintained by a screen. The other side of the screen carries the catalyst bed. In this construction, puddling again causes rough running and catalyst breakdown. Thus, these prior art constructions suffer from disadvantages.

SUMMARY OF THE INVENTION

In order to aid in the understanding of this invention, it can be stated in essentially summary form that is directed to a monopropellant thruster which has liquid propellant injectors for injecting propellant into the propellant decomposition catalyst bed. The injectors are of such design as to direct liquid strems into the catalyst bed to prevent puddling and to keep the streams away from the chamber wall. Flow rate through injectors is sufficiently high to prevent detonation inside the injectors. By this means, thrust reproducibility is achieved in a mechanically strong structure.

It is thus an object of this invention to provide a monopropellant gas generator in which hydrazine is dissociated to produce a hot gas for utilization, which generator is a strong reliable structure which provides reproducible thrust pulses without firing restrictions. It is a further object to provide a monopropellant thruster having a long life which is achieved by reduction in firing unevenness so that the catalyst is not broken down into fines. It is a further object to provide a monopropellant thruster which has a minimum liquid volume from the valve to the injector to minimize start and stop transients due to the time to fill an empty liquid hydrazine volume.

Other objects and advantages of this invention will become apparent from a study of the following portions of the specification, the claims, and the attached drawings.

DESCRIPTION OF THE PREFERRED EMBODIMENT

Figure 1:
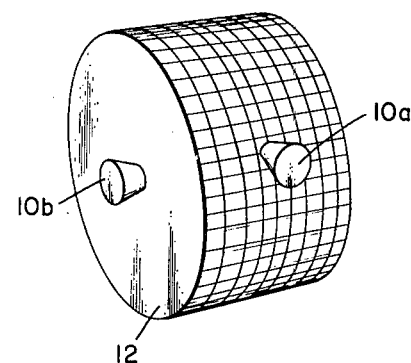
FIG. 1 is a perspective view of a device which can employ the monopropellant thruster of this invention.
Figure 2:
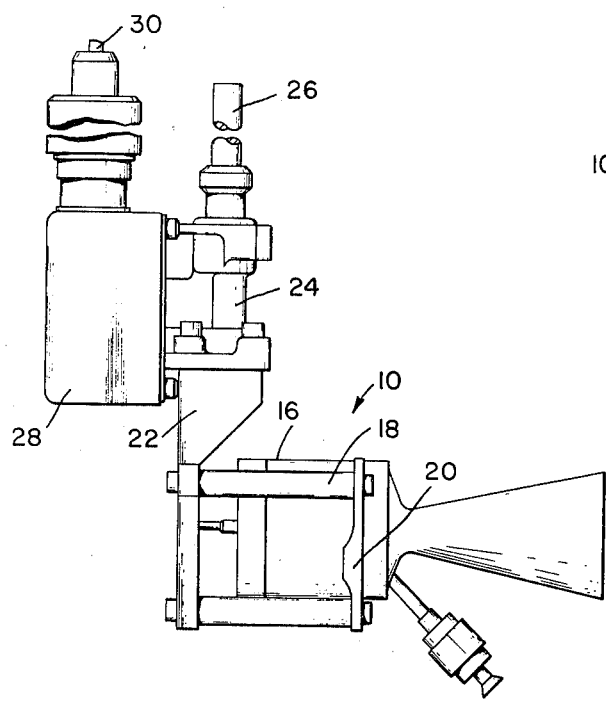
FIG. 2 is a side-elevational view of the monopropellant thruster of this invention.
Figures 3, 6:
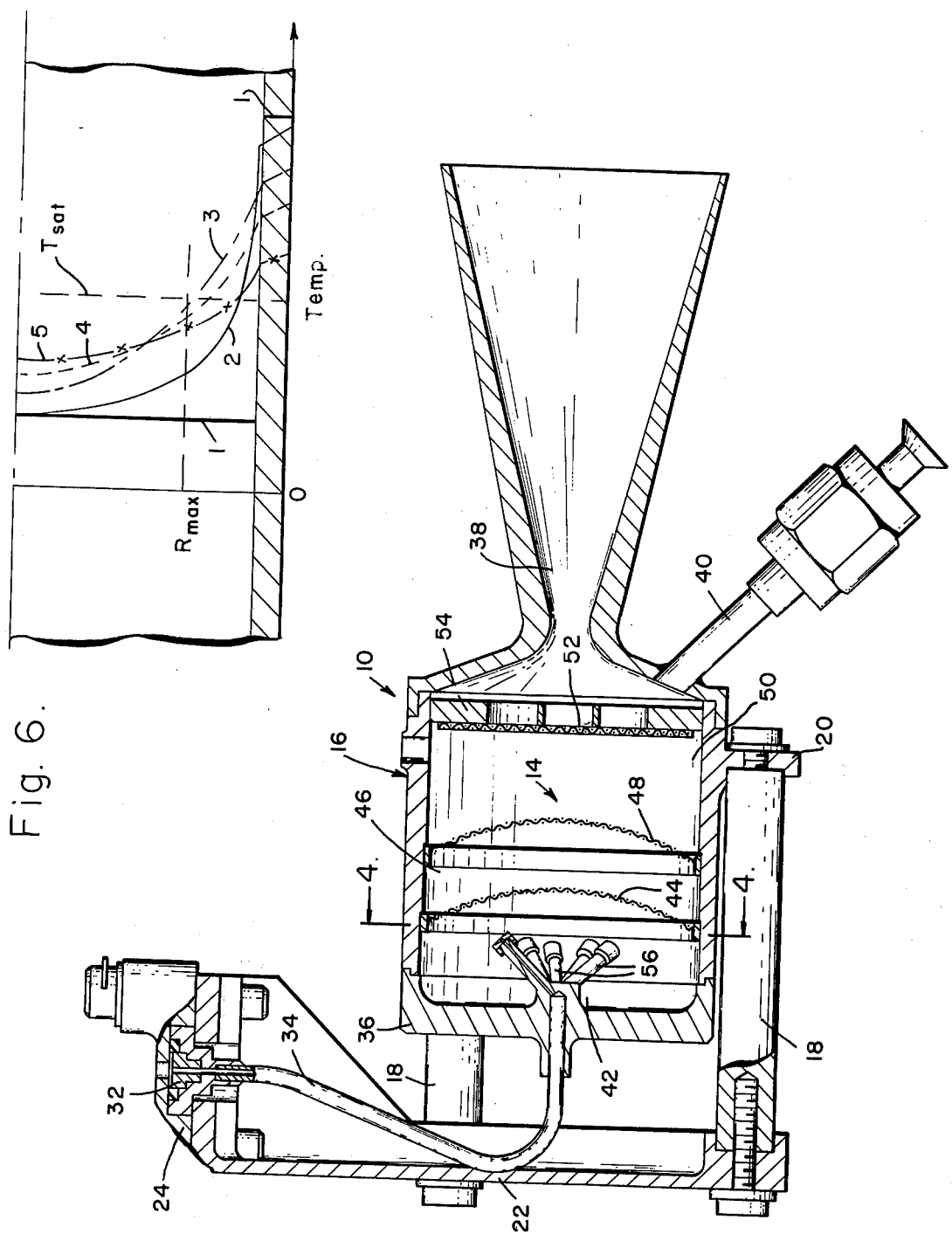
FIG. 3 is an enlarged longitudinal section through the thrust chamber and associated parts of the monopropellant thruster of FIG. 2.
FIG. 6 is a location-time-temperature chart of temperature conditions in the injector tube.

The monopropellant thruster of this invention is generally indicated at 10 in FIGS. 2 and 3. Thruster 10 is designed to be capable of controlling the flow of liquid hydrazine into a catalyst bed for dissociation in the bed for the production of hot gaseous by-products. These gaseous by-products can be used for operating turbines or pistons, or can be directly expanded out of a nozzle to produce thrust. In one of the manners in which the thruster 10 can be utilized, it is installed on a space vehicle 12. Space vehicle 12 has a radially positioned thruster 10a and an axially positioned thruster 10b.

Space vehicle 12 can be a satellite and can be stabilized by rotation about its axis. For movement along its axis, thruster 10b can be operated. For motion radially to the axis, thruster 10a can be fired whenever it is positioned so that thrust will urge the space vehicle 12 in a correct direction. Spin stabilized space vehicles rotate at a fairly high speed, such as 50 to 70 RPM, so that repeatability of thrust with respect to the rise time, duration, and decay time of the thrust is important to producing a net thrust in the desired direction. Thruster 10 is particularly designed to produce repeatable thrust, as well as have additional characteristics which relate to long thruster life and no restrictions on the frequency of thruster firing.

Referring more particularly to FIGS. 2 and 3, hot gas generation is accomplished in thrust chamber 14 in thruster body 16. Since the thruster body operates at elevated temperatures, isolation of the thruster body is accomplished by means of a set of three standoffs 18 mounted to forward flange 20 which is integrally formed with the thruster body. Mounting bracket 22 is secured to the other end of standoffs 18, and mounting bracket 22 is employed to mount the rest of thruster 10 onto the device which utilizes it. Thus, in the embodiment illustrated, mounting bracket 22 can mount the thruster upon vehicle 12 through a propellant valve. On the other hand, it can be employed to mount the thruster upon any device upon which such thrust is to be applied, including ground-mounted test stands and the like.

Hydrazine valve 24 is mounted on the upper part of mounting bracket 22. Hydrazine inlet pipe 26 comes from a source of liquid hydrazine under pressure and supplies the liquid hydrazine to hydrazine valve 24. A valve-operating solenoid is located within housing 28, and the solenoid is controlled by energization of control line 30. As seen in FIG. 3, the hydrazine outlet of valve 24 is equipped with orifice 32 which controls the flow rate. Supply tube 34 supplies the liquid hydrazine from the valve to the thruster body.

As is seen in FIG. 3, thruster body 16 throughout its main portion is in the form of a cylindrical tube which defines the thrust chamber 14. Rear wall 36 defines the rear of the thrust chamber, while nozzle 38 forms the outlet end of the thrust chamber where hot gas from the thrust chamber is expanded to produce thrust. Tap 40 is for measurement of pressure within the thrust chamber but the tap can be utilized for other purposes if desired.

There is a screen which divides thrust chamber 14 into several zones. First zone 42 is limited on its downstream side by first screen 44. Second zone 46 is limited on its downstream side by second screen 52. Screen 52 is mounted on the perforated support plate 54 to maintain the screen 52 in position against outflow of hot gases. If desired, the second zone can optionally be divided into second zone and third zone 50 by screen 48. Each of the zones 42, 46, and 50 contains a hydrazine dissociation catalyst. The most common and most satisfactory catalyst is the "Shell 405 Catalyst" made by the Shell Oil Company. This catalyst is the most satisfactory for dissociation of the liquid hydrazine, but is frangible or brittle so that it cannot be severaly handled without fracturing and powdering. It is preferable that first zone 42 contains a finer catalyst, while second and third zones 46 and 50 contains a coarser catalyst. The screens are intended to maintain the catalyst in their respective zones, and the downstream third screen 52 is intended to prevent the catalyst from exhausting in the gas stream; however, upon breakdown of the catalyst into powder, the catalyst is discharged and lost. The purpose of the screen 44 will be discussed in more detail below.

Figure 4:
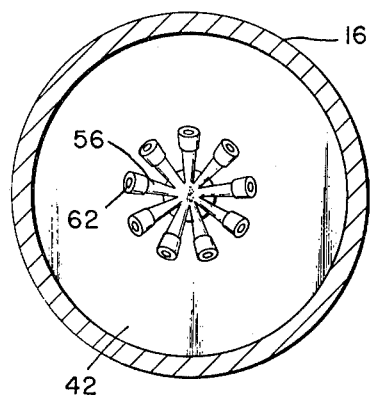
FIG. 4 is a section taken through the thrust chamber, generally along line 4—4 of FIG. 3.
Figure 5:
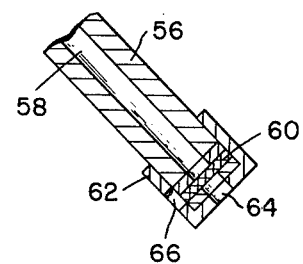
FIG. 5 is an enlarged section of one of the injector nozzles taken generally along the line 5—5 of FIG. 4.

The injector structure is seen in more detail in FIGS. 3, 4, and 5. Supply tube 34 is directly connected into the rear wall 36. A plurality of injector tubes 56 is formed on rear wall 36. Each injector tube 56 has an internal flow passage 58, see FIG. 5. The flow passages 58 are of uniform diameter and joined together directly where supply tube 34 terminates. Injector tubes 56 have their inlet ends close together and are divergently directed so that their outlet ends are separated. As is seen in FIG. 5, screens 60 are positioned over the outer end of flow passage 58. Cap 62 is positioned over the screens to hold them in place. Additionally, each cap 62 has openings 64 and 66 therein. As is seen in FIG. 3, the axial openings 64 are divergently directed while the radial openings 66 are convergently directed. Screens 60 are provided to prevent catalyst from entering into flow passage 58. The screens break up flow out of both of openings 64 and 66. The character of screens 60 are such that the flow streams are not on a fine spray which would cause detonation, but cause flow streams of sufficient size, full flowing out of cap openings 64 and 66, at least larger than the size of the catalyst particles so that the liquid flows as a solid stream through the catalyst bed at least for a short distance. The size of the screen openings is related to the direction of the openings 64 and 66 as well as the size of the catalyst particles so that flow from the divergent opening 64 does not strike the interior sidewalls of thruster body 16 but is broken up by the catalyst before it reaches the side walls. Furthermore, the solid stream flow of liquid hydrazine from the convergently directed radial opening 66 is such that each flow stream is broken up before the streams impinge upon each other.

The number of injector tubes 56 is dependent upon the desired flow rate of hydrazine which, in turn determines thrust, and the various dimensions are also related to this flow rate. Because of the minimal volume of liquid hydrazine between the propellant control valve and the injector nozzles, stable propellant flow is rapidly achieved after valve opening to provide excellent pulse time reproducibility. In addition, even though the temperature of the injector tubes 56 may be above the propellant autodecomposition temperature as the result of thermal soakback from previous firing, the hydrazine flow rate through flow passage 58 is sufficiently high that the hydrazine does not reach detonation temperature within the confines of the injector. The length of nozzles 56 from backplate 36 is approximately equal to the thrust chamber radius, so that the thermal mass of the nozzles is limited and the nozzles rapidly cool down upon firing.

The particular design of the liquid discharge is critical. As stated above, the screen assembly must be designed so that the hydrazine leaves the screen and enters the catalyst as a full stream from openings 64 and 66 and not as extremely fine sprays. If the diameter of the flow stream is less than the diameter of the catalyst the hydrazine will explosively decompose when it contacts the hot catalyst particles, such explosive decomposition generating high pressure waves which shatter the catalyst. The shattered catalyst is expelled through nozzle 38 to result in catalyst depletion and shortened life of the thruster. The number of screens and the geometry of the ports in the cap 62 must be such as to control each stream and prevent it from reaching the chambers walls or reaching another stream. The streams leaving the injector assembly are directed so that undecomposed hydrazine cannot impact any hot metal surface. Such would cause large pressure surges.

One of the life-limiting factors of a hydrazine decomposition thruster is the loss of the catalyst. One principal cause of the catalyst breakup is the high temperature high velocity products of decomposition of the hydrazine. Despite substantial elimination of catalyst breakup by substantial elimination of decomposition pressure waves through the catalyst bed, the thermal cycling causes some breakup. This results in initial void some distance downstream of injector tubes 56. Screen 44 is positioned so that this initial void appears in second zone 46 between screens 44 and 52. Although the void originates downstream in the catalyst bed, the pressure forces of the incoming hydrazine and the flow forces of the hot gases cause movement of the catalyst in the downstream direction to fill the void. As a consequence of the catalyst relocation, the void travels upstream. Without the first screen 44 in the appropriate position, the void would travel upstream until it reaches the injector nozzle openings. This location of the void can cause puddling of liquid hydrazine, with very rough chamber pressure response and nonreproducible thrust performance. The rough chamber pressure operation in turn causes further fracture of the catalyst particles and ultimately results in decreasing the useful life of the thruster. By proper location of the first screen 44, it intercepts the void and holds the void in second zone 46. By preventing the void from migrating from its point of origin to the injector, smooth and reproducible thrust is achieved. Thus, the positioning of the screen 44 is critical, being upstream of the location where the void originates, but downstream of the injector a distance to allow sufficient catalytic decomposition before the hydrazine reaches the void.

As stated previously, to obtain a monopropellant hydrazine thruster that will achieve highly reproducible pulse mode operation and provide long, useful thruster life, it is necessary to consider carefully the application of: (a) the design of the liquid discharge into the catalyst bed by the proper screen-cap relationship; (b) the configuration of the device to deliver liquid hydrazine into the catalyst bed to prevent localized puddling or impingement of the liquid on the thruster walls; (c) the location of the upstream screen retainer to prevent migration of a catalyst bed void to a position adjacent to the distributor nozzles; and (d) the flow rate of hydrazine within the injector passages to preclude detonation within the passages because of heat soakback into the injector as a consequence of or subsequent to a thruster firing.

In order to illustrate in more detail the principles and objectives of this invention, an embodiment of the invention has been selected for purposes of illustration and description. The unit is constructed primarily of cobalt base superalloy L605 because of its desirable physical strength at the elevated temperature of approximately 1700° F typically developed by catalystic thrusters having a nominal thrust level of 5 pounds force.

The internal diameter of the decomposition chamber is 1.17 inches with an overall length of 1.2 inches. The decomposition chamber is divided into two zones, each zone containing the most common and most satisfactory hydrazine dissociation catalyst, "Shell 405," made by the Shell Oil Company. The first zone 42 contains 20 to 30 mesh size granular catalyst between 0.033 and 0.021 inches and the second zone 46 contains 14 to 18 mesh size granular catalyst between 0.047 and 0.037.

Buried within this first zone of the fine catalyst are nine distribution tubes 56 which are integrally machined into the rear wall 36 of the thrust chamber body 16. Each of the nine distribution tubes contain a 0.020 inch diameter passage 58 which intersects the 0.063 inch diameter propellant supply passage 34. Over the outer end of each distribution tube 56 are four flat screens 60 that are just slightly smaller in diameter than the outside diameter of the tube 56 on which they rest. The two screens closest to the outlet end of th distribution port are 80 × 80 mesh screen also made from L605 alloy and the remaining screens are 200 × 200 mesh also made from L605 alloy. The orientation of the cross meshes of the screens with respect to each other is entirely random. Cap 62 containing a single inside bore diameter for the appropriate length of the cap is positioned over the screens to retain them in place and to permit attachment of the cap to distribution tube 56. Each of the retainer caps has in its side a slot 66 0.025 inches in width over a 90° arc as well as 0.040 inch diameter opening 64 at the top end. Semi-empirical techniques verified by water flow test were used to arrive at matching the screen holding volume (number and mesh of screens), the size of the ininjector passage and the retaining cap exit areas. Proper matching will provide a liquid discharge entering the catalyst as full streams approximately the same size as the cap exit areas that do not contain any spray of fine streams. The full stream flow is critical since special tests showed that a liquid stream smaller than the catalyst grains would result in very roudh operation and/or spiking and would seriously degrade the useful life of a monopropellant thruster while a stream from two to six times the average catalyst particle results in smooth operation leading to long life. Such a liquid stream is sufficiently small in diameter to allow adequate decomposition and thus prevent the accumulation of large volumes of liquid hydrazine. Liquid hydrazine must be admitted to the upstream fine catalyst bed 42 in a manner that will preclude the formation of these liquid pockets or puddles which, if formed, can decompose as a body and would result in high pressure surges that would tend to crush the catalyst into fines. In addition to the requirement of having a liquid injection stream smaller than six times the catalyst size, this invention also prevents puddles in the catalyst by having the intersection of the various streams occur only after the streams have passed at least 0.10 inches of catalyst thus allowing the liquid hydrazine sufficient opportunity to decompose adequately to prevent puddling of large quantities of liquid.

In the manner just described, it is a relatively simple matter to eliminate all pockets or puddles except for those that may form directly on the injector screens 60. Since the screens of this design are limited to the minimum diameter that will produce the full stream from cap openings 64 and 66 discussed above, the volume of liquid which can be drawn into them is also limited. By maintaining a proper thermal environment near the injector as described below, and allowing any trapped liquid easy exit paths without orifice restrictions into the catalyst bed, pressure surges that might occur from puddling on the injector screens are eliminated.

To provide a suitable injector thermal environment during firing and to preclude auto-decomposition within the injector passages because of heat soakback resulting from a previous thruster firing, the depth of penetration of the tubes into the catalyst, the diameter of the injector passage (consequently the flow velocity), and the wall thickness of the distribution tubes must be controlled.

The flow rate at the minimum hydrazine inlet pressure condition is the more critical since the cooling effect of the incoming hydrazine will be a minimum. At minimum inlet pressure, the flow rate is approximately 0.010 $lb_m$/sec, which converts to a flow velocity of 8.1 ft./sec. Using conventional engineering, as taught in "Heat and Mass Transfer," E. R. C., Eckert and R. M. Drake, Jr., McGraw Hill Book Company, Inc., 1959, or any other modern heat transfer textbook, the temperature of the hydrazine leaving the injector in the limiting case is seen to be approximately 300° F, which is below the auto-decomposition temperature for hydrazine. In addition, the injector walls are maintained below the value required for nucleate boiling to occur, thus preventing excessive pressure drop. This required maximum temperature is below the saturation temperature corresponding to the local liquid pressure. However, under some conditions between thruster firings, the injector passages can increase to temperatures exceeding saturation temperature. For flow velocities exceeding 5 ft/sec, there will be no nucleate boiling of the injected hydrazine if the heat capacity of the injector tubes is sufficiently low so that the liquid will not boil. The limiting heat capacity of the tubes can be calculated from conventional heat transfer relationships, see the Eckert and Drake reference, supra.

FIG. 6 illustrates a cross section through the injector passage. Temperature curve 1 illustrates the injector tube at its original high temperature due to thermal soakback between firings. Also illustrated is the incoming hydrazine temperature. Curve 2 illustrates a short time later, the liquid temperature has increased and the wall temperature has descreased. Curves 3 and 4 illustrate progressive heating of the liquid and cooling of the wall. It is known from "A Study of Boiling Heat Transfer," M. E. Ellion, PhD Thesis, California Institute of Technology, 1953, that the liquid will not form vapor bubbles at the wall if the thickness R max of the liquid that exceeds the saturation temperature is less than 0.005 inch. For the design of this invention, the criteria is satisfied so that there will be neither local boiling near the wall or bulk boiling of the liquid.

The eighteen streams that result from the configuration of the injector are oriented ± 45° from the axis of the unit to fulfill the criterion that liquid hydrazine must be decomposed before reaching a hot, high-heat capacity surface. Undesirable impingement of liquid can arise if the injector exits are pointed toward the chamber walls with insufficient catalyst depth intervening to initiate decomposition before the liquid reaches the hot metal wall. A depth of approximately 0.100 inch is adequate for this injector design, although depths up to 0.250 are acceptable without causing the chamber to be excessively large. An excessively large chamber would remove a large percentage of the energy released during the first part of each firing and result in low performance. For this design a minimum depth of 0.200 inch in front of each injector exit was chosen.

The upstream screen retainer 44 was formed from two spherically-curved layers of 40 × 40 mesh screen with the cross meshes at a 45° rotation relative to each other and retained by a ring at the extremities of the curved screens. This was done to eliminate a high-heat capacity surface within the decomposition chamber upon which liquid could impinge. The location of the upstream screen retainer is of great importance to achieving long, useful thruster life.

It is common knowledge within the catalytic monopropellant industry that one of the factors limiting thruster life is catalyst attrition. The attrition is due to catalyst grain fracturing due to several causes: (1) internal pressure forces resulting from liquid hydrazine being drawn into the catalyst pores and subsequently decomposing causing high pressure; (2) external forces due to the high velocity products of decomposition; and (3) thermal expansion forces.

X-ray examination of thrusters that have reached their life limit of smooth useful operation always reveals that the catalyst has voids at the injector inlet. It has long been believed that these voids originated at the injector exit ports. A most interesting discovery made during early research work on this invention is that with a properly designed injector, the initial voids would form a considerable distance downstream from the injector and did not originate at the injector-to-catalyst interface itself as is commonly believed. However, after the initial voids are formed, they quickly migrate towards the injector in conventional designed thrusters because the incoming hydrazine drives the catalyst particles into the downstream voids. As this process continues, the net effect is the propagation of the void upstream to the injector. With the void at the injector, there is no longer a driving force present and the void remains at the injector. As incoming hydrazine fills the voids at the injector and then decomposes as a bulk puddle, large pressure waves are generated which further fracture the catalyst and enlarge and voids. Voids form at some distance downstream from the injector exit that depends upon the injector characteristics as well as the catalyst and hydrazine liquid temperatures. For an injector stream diameter of 0.040 inch and a catalyst and hydrazine temperature of 35° F, this distance is greater than 0.40 inch. For finer streams of warmer catalyst and hydrazine, this distance decreases. Further experimentation revealed that locating the uppermost portion of the dome of the upstream retainer 0.350 inch downstream from the liquid-to-catalyst interface at the injector openings very effectively prevented the migration of all voids to the injector and still provided adequate length of fine catalyst for easy low temperature starting. The subject matter of referenced material, including The Rule 132 Declaration of Mar. 17, 1975 in the parent application is incorporated herein in its entirely by this notation.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

We claim:

1. A monopropellant thruster comprising:
   a thruster body having a thrust chamber therein for containing a monopropellant dissociation catalyst for exothermic monopropellant dissociation;
   means for injecting monopropellant into the catalyst, said means comprising a plurality of imperforate injector tubes each having an outlet port at its outlet end extending into said thrust chamber, each of said injector tubes having a flow passage of substantially uniform cross-sectional area therethrough extending to said outlet port;

a screen positioned over the outlet end of each of said flow passages in each of said injector tubes, said screens having openings therein of such size as to break up flow out of said flow passages into streams having a size at least as large as the size of the catalyst in said thrust chamber and means is provided for holding said screens in place.

2. The thruster of claim 1 wherein said means for holding is a cap and each of said caps has an axial outlet so that each of said injector tubes discharges a liquid monopropellant stream into the thruster chamber with said streams being divergent and with the stream size and flow being such that each stream is broken up in the catalyst in the thrust chamber before the liquid monopropellant impinges upon the thrust chamber wall.

3. The thruster of claim 1 wherein said means for holding is a cap and each of said caps has a radial opening with said radial openings being directed so that said injector tubes discharge a liquid monopropellant stream into the thrust chamber with the streams being convergent to each other, the streams being of such size and such velocity that they are broken up by the catalyst in said thrust chamber before they impinge one another.

4. The thruster of claim 3 wherein each of said caps also has an axial outlet so that each of said injector tubes discharges a liquid monopropellant stream into the thruster chamber with said streams being divergent and with the stream size and flow being such that each stream is broken up in the catalyst in the thrust chamber before the liquid monopropellant impinges upon the thrust chamber wall.

5. The monopropellant thruster of claim 1 wherein said flow passage through each said injector tube comprises substantially cylindrical bore, the tube bore being of such diameter and the tube wall being of such thickness and the flow rate being such that liquid metal propellant more than about 0.005 inches away from the injector tube wall is at a temperature lower than the monopropellant vaporization temperature.

6. The monopropellant thruster of claim 1 wherein a screen is positioned across said thrust chamber to divide said thrust chamber and divide catalyst therein into first and second zones, said screen being positioned so that liquid monopropellant from said injection means passes therethrough, said screen being positioned so that the void produced by thermal cycling of the catalyst is positioned downstream of said screen so that the void cannot reach the injector tube outlet by catalyst shifting, thereby enhancing thrust reproducibility and useful life.

7. The thruster of claim 1 wherein said plurality of injector tubes extend into said thrust chamber so that catalyst in said thrust chamber extends around said injector tubes, each of said injector tubes having a flow passage therethrough having an inlet and an outlet and being imperforate between said inlet and said outlet and said injector tubes being positioned so that the inlets of said flow passages are adjacent each other and the outlets are separated from each other, each said injector tube terminating at an injector orifice, said injector orifices each discharging a liquid monopropellant stream into the thrust chamber with such streams being directed and with the stream size and flow being such that each stream is broken up in the catlyst in the thrust chamber before the liquid monopropellant impinges on a thrust chamber wall or on another monopropellant stream.

8. The monopropellant thruster of claim 1 wherein a screen is positioned across said thrust chamber to divide said thrust chamber and catalyst positioned therein into first and second zones, said screen being positioned so that liquid monopropellant from said injection means passes therethrough, said screen being positioned so that the void produced by thermal cycling of the catalyst is positioned downstream of said screen so that the void cannot reach the injector tube outlet by catalyst shifting, thereby enhancing thrust reproducibility and useful life.

9. A monopropellant thruster comprising:

a thruster body having a thrust chamber therein for containing catalyst for exothermically decomposing monopropellant into hot gas to produce thrust;

means for injecting monopropellant into the catalyst, said injection means comprising a plurality of divergently oriented injector tubes extending into said thrust chamber so that catalyst in said thrust chamber extends around said injector tubes, each of said injector tubes having a flow passage therethrough having an inlet and an outlet and being imperforate between said inlet and said outlet and said injector tubes being positioned so that the inlets of said flow passages are adjacent each other and the outlets are separated from each other said flow passage being of such diameter and the tube walls being of such thickness and the flow rate being such that liquid monopropellant more than 0.005 inches away from the injector tube walls is at a temperature lower than the monopropellant vaporization temperature at that point so that thermally caused autodecomposition is inhibited in said injector tubes.

10. The thruster of claim 9 wherein screens are positioned over the outlet end of said flow passage in each of said injector tubes, said screens having openings therein of such size as to break up flow out of said flow passages into streams having a size at least as large as the size of catalyst in said thrust chamber, and a cap is positioned over each of said screens to hold said screens in place.

11. The thruster of claim 9 wherein said outlet is axial so that each of said injector tubes discharges a liquid monopropellant stream into the thruster chamber with said streams being divergent and with the stream size and flow being such that each stream is broken up in the catalyst in the thrust chamber before the liquid monopropellant impinges upon the thrust chamber wall.

12. The thruster of claim 9 wherein said opening is radial with said radial openings being directed so that said injector tubes discharge a liquid monopropellant stream into the thrust chamber with the streams being convergent to each other, the streams being of such size and such velocity that they are broken up by the catalyst in said thrust chamber before they impinge one another.

13. The thruster of claim 12 wherein there is also an axial outlet in each of said tubes so that each of said injector tubes discharges a liquid monopropellant stream into the thruster chamber with said streams being divergent and with the stream size and flow being such that each stream is broken up in the catalyst in the thrust chamber before the liquid monopropellant impinges upon the thrust chamber wall.

14. The thruster of claim 9 further including:

a screen positioned across said thrust chamber to divide said thrust chamber and catalyst positioned therein into first and second zones, said screen being positioned so that liquid monopropellant from said injection means passes therethrough, said screen being positioned so that the void produced by thermal cycling of the catalyst is positioned downstream of said screen so that the void cannot reach the injector tube outlet by catalyst shifting, thereby enhancing thrust reproducibility and useful life.

15. The thruster of claim 14 further including an outlet screen for preventing loss of undegraded catalyst.

16. The thruster of claim 15 wherein said injection means comprises a plurality of injector tubes extending into said thrust chamber.

17. The thruster of claim 16 wherein said injector tubes are divergently oriented and each has a flow passage therethrough so that the inlet of said flow passages are adjacent to each other and the outlet ends are separated from each other.

18. The thruster of claim 17 wherein screens are positioned over the outlet ends of said flow passage in each of said injector tubes, and a cap is positioned over each of said screens to hold the screens in place.

19. The thruster of claim 10 wherein each of said injector tubes discharges a liquid monopropellant stream into the thruster chamber with said streams being divergent and with the stream size and flow being such that each stream is broken up in the catalyst in the thrust chamber before the liquid monopropellant impinges upon the thrust chamber wall.

20. The thruster of claim 10 wherein each of said injector tubes discharges liquid monopropellant stream into the thrust chamber with the streams being convergent to each other, the streams being of such size and such velocity that they are broken up by the catalyst in said thrust chamber before they impinge one another.

21. The thruster of claim 20 wherein each of said injector tubes also discharges a liquid monopropellant stream into the thruster chamber with said streams being divergent and with the stream size and flow being such that each stream is broken up in the catalyst in the thrust chamber before the liquid monopropellant impinges upon the thrust chamber wall.

22. A monopropellant thruster comprising a thruster body having a thrust chamber therein for containing a catalyst for exothermic decomposition of a liquid monopropellant into hot gas for producing thrust;
   means for injecting liquid monopropellant into said thrust chamber, said injection means comprising an injector tube extending partway through said thrust chamber and having an outlet for liquid monopropellant into said thrust chamber, said injector tube having a bore of such diameter and the tube walls being of such thickness and the flow rate being such that liquid monopropellant more than 0.005 inches away from the injector tube walls is at a temperature lower than the monopropellant vaporization temperature at that point;
   a screen positioned across said thrust chamber to divide said thrust chamber in catalyst position therein into first and second zones, said screen being positioned so that liquid monopropellant from said injection means passes therethrough, said screen being positioned so that the void produced by thermal cycling of a catalyst is positioned downstream of said screen so that the void cannot reach the injector tube outlet by catalyst shifting, thereby enhancing thrust reproducibility and useful life.

23. The monopropellant thruster of claim 9 wherein said thrust chamber has walls and contains a particulate monopropellant dissociation catalyst for exothermic monopropellant dissociation and a screen is positioned across said thrust chamber to divide said thrust chamber and catalyst positioned therein into first and second zones, said screen being positioned so that liquid monopropellant from said injection means passes therethrough, said screen being positioned so that the void produced by thermal cycling of the catalyst is positioned downstream of said screen so that the void cannot reach the injector tube outlet by catalyst shifting, thereby enhancing thrust reproducibility and useful life.

24. The thruster of claim 23 wherein each of said caps has an axial outlet so that each of said injector tubes discharges a liquid monopropellant stream into the thruster chamber, with said streams being divergent and with the stream size and flow being such that each stream is broken up in the catalyst in the thrust chamber before the liquid monopropellant impinges upon the thrust chamber wall.

25. The thruster of claim 23 wherein each of said caps has a radial opening with said radial openings being directed so that said injector tubes discharge liquid monopropellant streams into the thrust chamber which are convergent to each other, the streams being of such size and such velocity that they are broken up by the catalyst in said thrust chamber before they impinge one another.

26. The thruster of claim 24 wherein each of said caps has a radial opening with said radial openings being directed so that said injector tubes discharge liquid monopropellant streams into the thrust chamber which are convergent to each other.

27. A monopropellant thruster comprising:
   a thruster body having walls defining a thrust chamber therein for containing a particulate monopropellant dissociation catalyst for exothermic monopropellant dissocation;
   a laterally imperforate injector tube extending into said thrust chamber, said injector tube having a bore therein, the tube bore being of such diameter and the tube walls being of such thickness and the flow rate being such that liquid monopropellant more than 0.005 inches away from the injector tube walls is at a temperature lower than the monopropellant vaporization temperature at that point, said injector tube terminating with an injector orifice, said injector tube extending into said thrust chamber a distance substantially equal to half the distance between said thrust chamber walls, a cap on said injector and a screen under said cap, said injector orifice being in said cap, said screen and said orifice being dimensioned so that a full stream of liquid monopropellant is discharged from said orifice into the monopropellant dissociation catalyst.

28. A monopropellant thruster comprising:
   a thruster body having a thrust chamber therein for containing catalyst for exothermically decomposing monopropellant into hot gas to produce thrust;
   means for injecting monopropellant into the catalyst, said injection means comprising a plurality of divergently oriented injector tubes extending into said thrust chamber so that the catalyst in said thrust chamber extends around said injector tubes, each of said injector tubes having a flow passage therethrough having an inlet and an outlet and being imperforate between said inlet and said outlet and said injector tubes being positioned so that the inlets of said flow passages are adjacent each other and the outlets are separated from each other, each of said injector tubes terminating at an injector orifice, screens positioned over the orifice outlets of said flow passages in each of said injector tubes, said screens having openings therein of such size to break up flow out of the flow passages in the streams having a size at least as large as the size of the catalyst in said thrust chamber, said streams being directed and the stream flow being such that each stream is broken up in the catalyst in the thrust chamber before the liquid monopropellant impinges on a thrust chamber wall or on another monopropellant stream.

29. A monopropellant thruster comprising:
a thruster body having a thrust chamber therein for containing catalyst for exothermically decomposing monopropellant into hot gas to produce thrust;
means for injecting monopropellant into the catalyst, said injection means comprising a plurality of divergently oriented injector tubes extending into said thrust chamber so that catalyst in said thrust chamber extends around said injector tubes, each of said injector tubes having a flow passage therethrough having an inlet and an outlet and being imperforate between said inlet and said outlet said flow passages in said injector tubes being of such diameter and the tube walls of said injector tubes being of such thickness and the flow rate of liquid monopropellant through the injector tubes being such that liquid monopropellant more than 0.005 inches away from the injector tube walls is at a temperature lower than the monopropellant vaporization temperature at that point, said injector tubes being positioned so that the inlets of said flow passages are adjacent each other and the outlets are separated from each other, each said injector tube terminating at an injector orifice, said injector orifices each discharging a liquid monopropellant stream into the thrust chamber with said streams being directed and with the stream size and flow being such that each stream is broken up in the catalyst in the thrust chamber before the liquid monopropellant impinges on a thrust chamber wall or on another monopropellant stream.

* * * * *